United States Patent
Hu et al.

(10) Patent No.: US 7,411,866 B1
(45) Date of Patent: Aug. 12, 2008

(54) USER INTERFACE CONTAINING ACOUSTIC SENSING MODULES

(75) Inventors: Catherine Ka Gee Hu, Kowloon (CN); Kinsun Kin Sun Tung, Kowloon (CN); Lawrence Ming Tat Lau, Kowloon (CN)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 0 days.

(21) Appl. No.: 11/898,810

(22) Filed: Sep. 17, 2007

(51) Int. Cl.
*G09G 5/00* (2006.01)
(52) U.S. Cl. .................... 367/135; 367/198
(58) Field of Classification Search .......... 367/135, 367/198; 345/156; 710/1, 12
See application file for complete search history.

(56) References Cited

U.S. PATENT DOCUMENTS

| 4,700,362 | A * | 10/1987 | Todd et al. ............ 375/249 |
| 2006/0259205 | A1* | 11/2006 | Krum ..................... 701/1 |
| 2007/0257881 | A1* | 11/2007 | Nurmela et al. ......... 345/156 |

FOREIGN PATENT DOCUMENTS

JP    56044255 A  *  4/1981

OTHER PUBLICATIONS

Joseph A. Paradiso, Che King Leo, Nisha Checka, Kaijen Hsiao; Passive Acousic Sensing for Tracking Knocks Atop Large Interactive Displays; Jun. 12-14, 2002.

* cited by examiner

*Primary Examiner*—Dan Pihulic
(74) *Attorney, Agent, or Firm*—Robert M. DeWitty

(57) ABSTRACT

The present invention relates to a user interface system that is acoustically operated for the control of connected devices. Through the interface, acoustic sounds, such as tap, can be distinguished from less than 10 cm apart.

8 Claims, 6 Drawing Sheets

USER INTERFACE CONTAINING ACOUSTIC SENSING MODULES

BACKGROUND

Taps, or knocks, are commonly used to attract attention. It is one form of informal communication. In different cultures, tapping or knocking can share the same meaning. For instance, both in Eastern or Western countries, it is polite for one to tap on the door to seek approval before entering a room. The taps signify the person's intention of entering the room and also arouse attention amongst those inside the room to address this intent.

In Chinese culture over meals, there is a convention for one to gently tap on the table with his knuckles continuously when another person is filing his/her cup with tea. This knuckling gesture conveys appreciation and gratitude to the other person, and is believed to have come from a legend that once there was a King disguised in peasant wear to informally cruise his country, and who was at meal with his liegeman, serving tea to one of them. The liegeman should have knelt on the ground and bowed his head to receive this divine treatment from the King. In order not to reveal his royal status, the King signaled the liegeman to tap on the table with knuckles of his bent fingers in place of the kneeling and bowing. In addition to common casual communication, tapping could also be used to communicate more specific information. In particular, a tapping sequence specifically constructed (e.g. with specific intervals in between taps) could be used to represent or "encode" a particular piece of information or message. For example, children in particular, like to create secret codes by special knocking patterns on the door to identify friends from strangers. This code is simply composed by a sequence of knocks that follows some kind of rhythm. In principle, this can also be explained as the distribution of knocks within a certain time. By varying the time intervals in between knocks, different rhythms of knock sequences can be created.

Finally, tapping is also one form of physical externalization of thoughts and emotions. Since taps already exist as an informal form of communication, it offers good potentials in building upon on this common and natural human gesture to developing intuitive interfaces to digital devices. There is the possibility of exploiting both the rhythm ("time-based") and/or the path ("position-based") of a tap sequence for system manipulation. Tangible User Interface (TUI) that makes use of tapping as an input method can simplify the control of many existing systems. It offers an elegant, simple, and natural form of interaction.

In order to maximize the diversity in application as well as the interactivity between the system and user, the interactive system would be desirable to be able to recognize both the rhythm ("time-based") and the path ("position-based") of knock sequence efficiently and precisely.

The prior art has shown sound-sensitive interactive surface. The Passive Acoustic Tap Tracking Across Large Interactive Surface is a system that locates the position of knocks and taps atop a large sheet of glass surface. Microphones embedded at four corners of the sheet glass are used to find the position of knocks of the surface. By calculating and comparing the time that sound waves travel from where the knock occurs to the four microphones on the surface, position of the knock on the surface can be measured. Unfortunately, this method of tracking position of taps on a surface has an accuracy problem. It has been shown that such a system is not able to resolve knocks that are spaced less that 10 cm apart, and so the system was inaccurate in tracking the path ("position based") of knocks with this range.

It is an object of the present invention to overcome the disadvantages and problems in the prior art by providing a new acoustic sensitive interactive surface.

DESCRIPTION

The present invention relates to a user interface system that is sound-sensitive and controllable using tap sequences, as well as methods of activation via tap sequences. The present invention includes a matrix of modules in communication with an encoder, a decoder, a networking device, and a processor. The present invention is capable of operation by focusing on the time intervals in a tap sequence, and/or focusing on locations of taps in a tap sequence. The present invention is suitable for controlling a variety of devices, including but not limited to electronic equipment such as radios or television, lighting systems, hand held devices, and controlling housing environments. The apparatus and method is beneficial for the control of a device by minimal interaction.

These and other features, aspects, and advantages of the apparatus and methods of the present invention will become better understood from the following description, appended claims, and accompanying drawings where:

Figure 5:
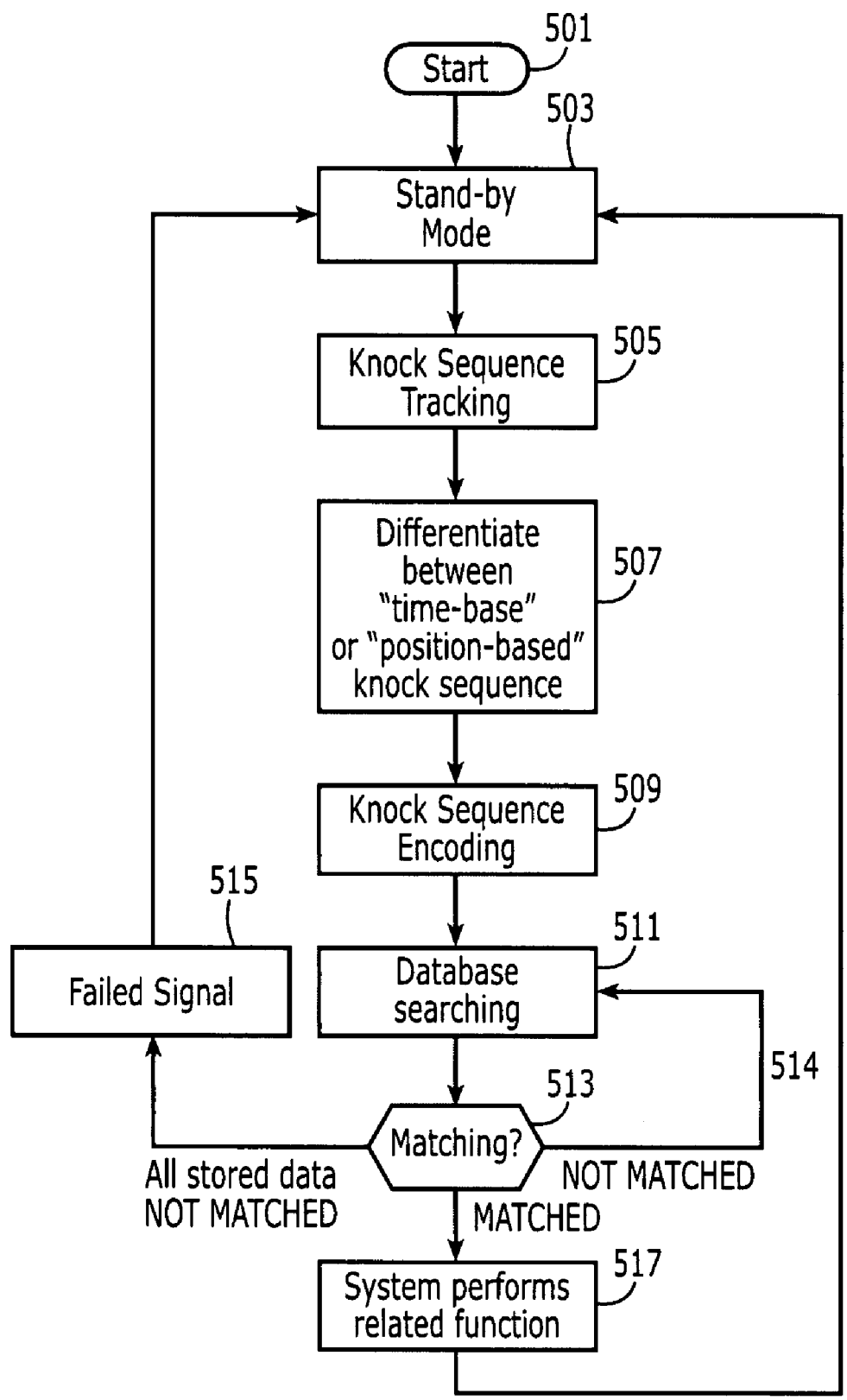
Figure 6:
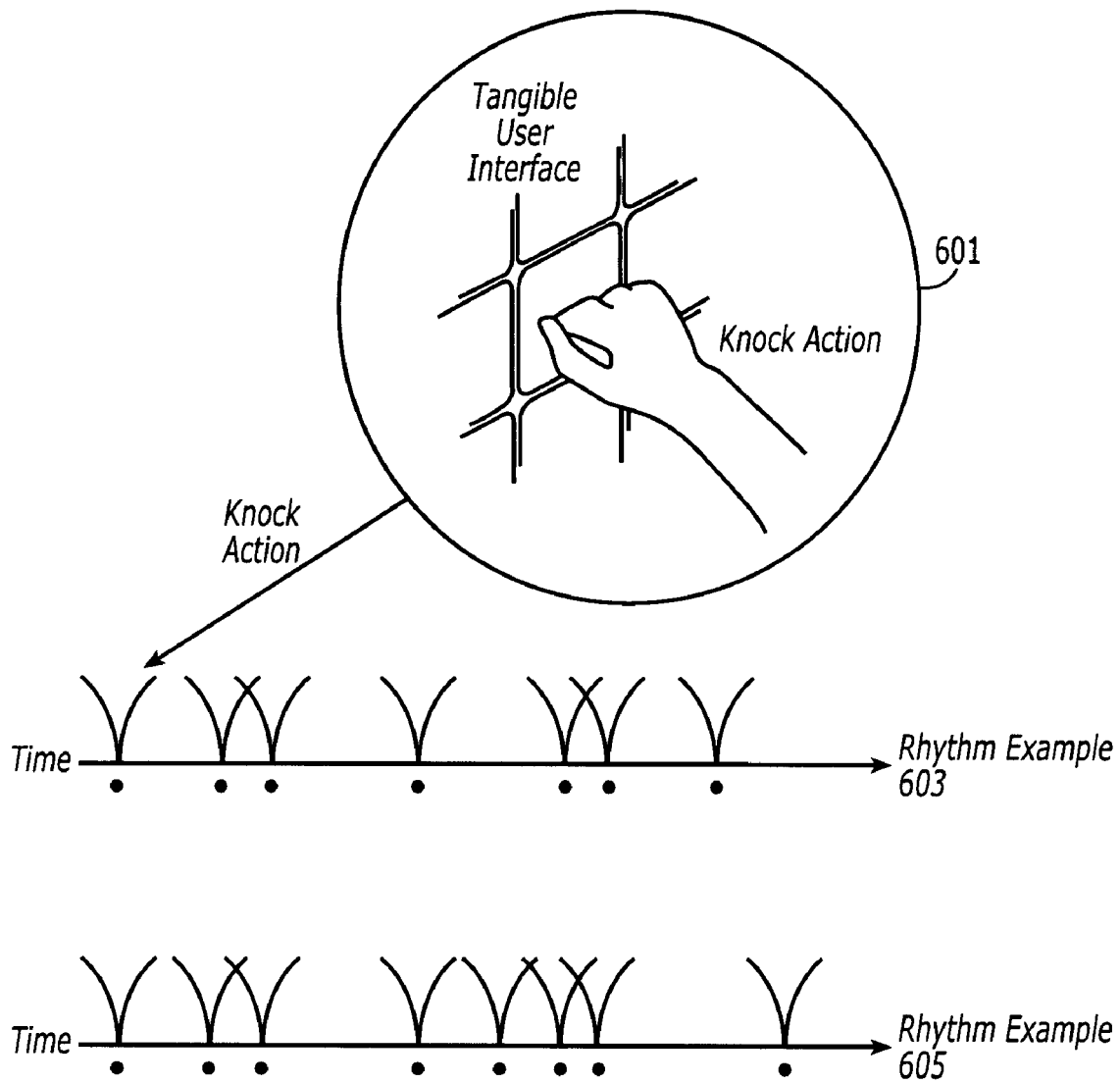

FIG. 5 exhibits a network of controlling devices through the present user interface system;

FIG. 6 shows time-based operation of the present method; and

Figure 7:
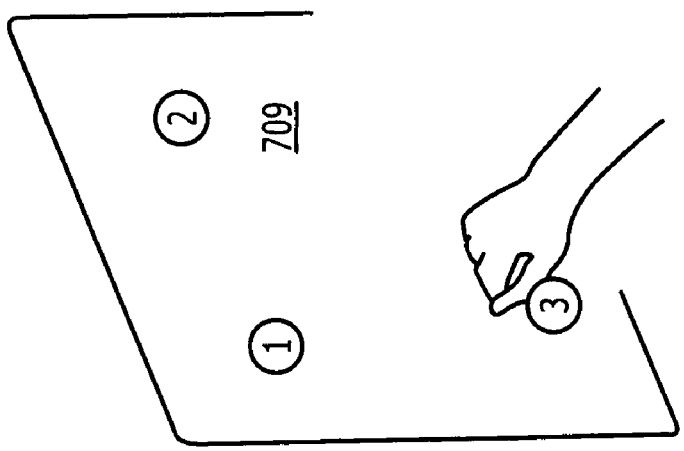
Figure 7:
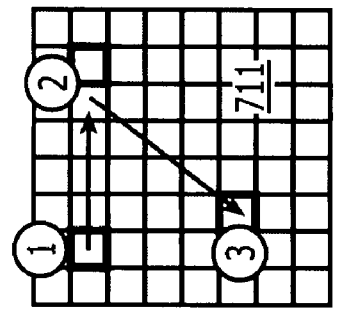
Figure 7:
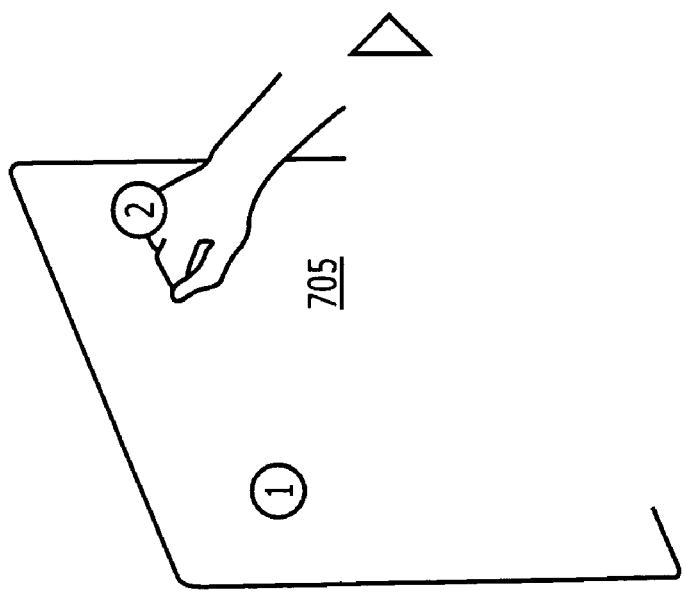
Figure 7:
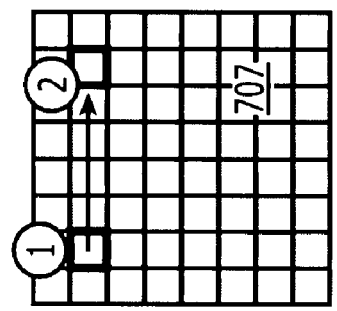
Figure 7:
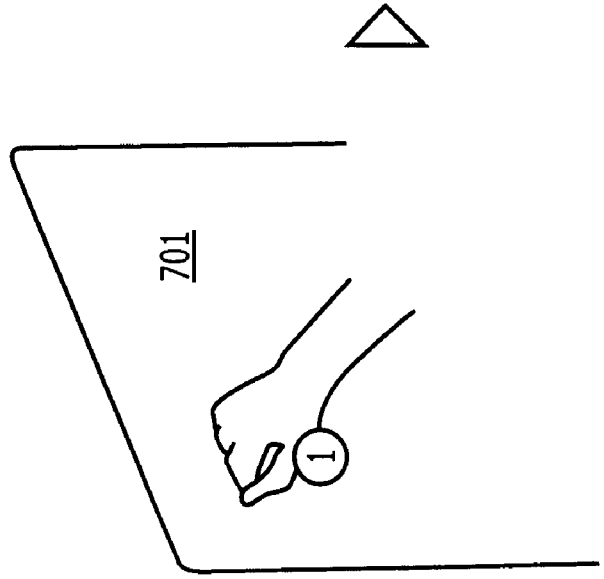
Figure 7:
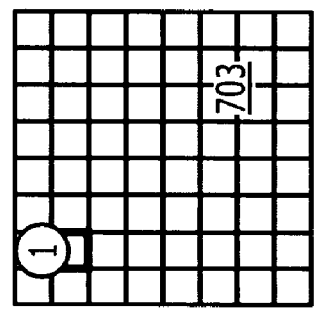

FIG. 7 shows position-based operation of the present method.

The following description of certain exemplary embodiment(s) is merely exemplary in nature and is in no way intended to limit the invention, its application, or uses. Throughout this description, the term "tap(s)" shall refer to a quick, light blow and shall include knocking, rapping and the like.

Figure 1A:
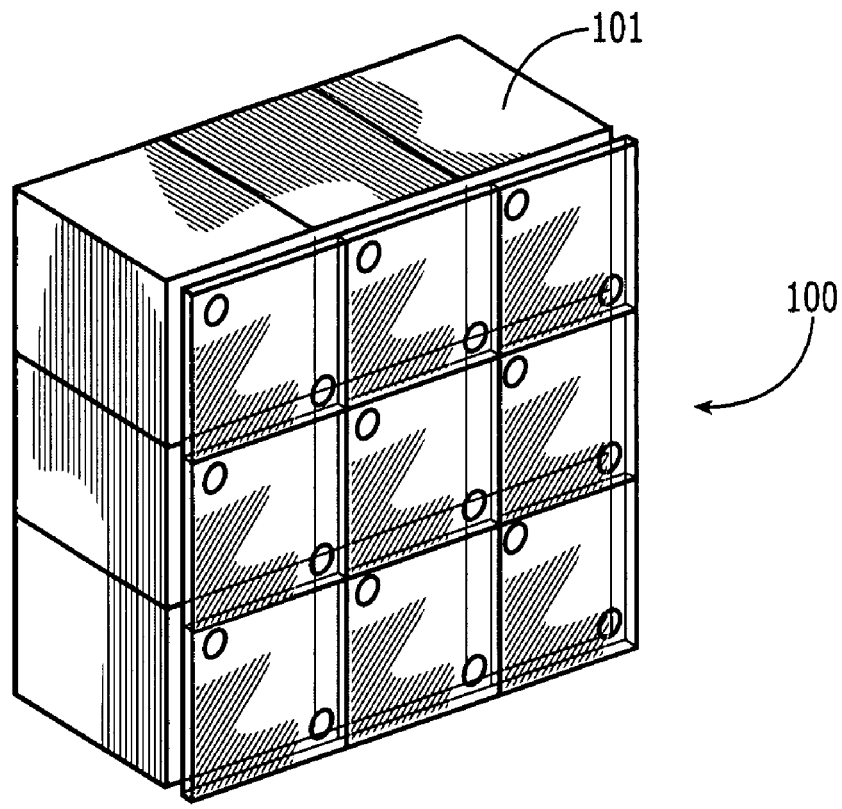
FIG. 1 shows a matrix of modules and a module of the present invention.
Figure 1B:
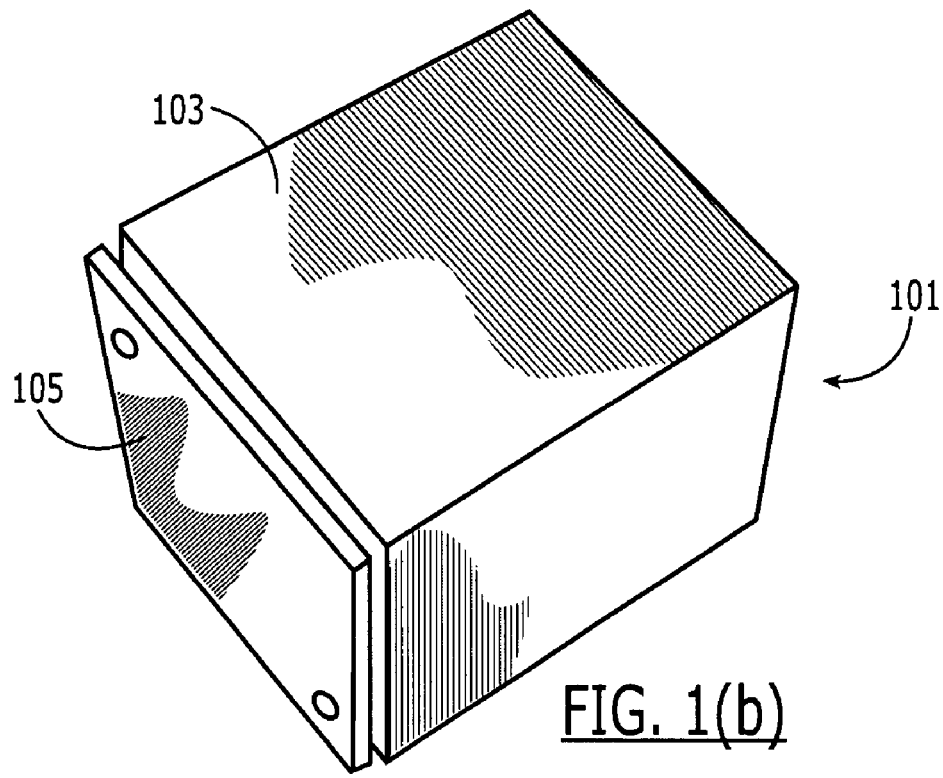

Now, to FIGS. 1-7,

FIG. 1 is an embodiment of a matrix of modules 100 used in the present invention.

The matrix of modules 100 is made from individual knock sensing modules 101 removably connected, i.e., capable of being individually disconnected, with each other. The matrix 100 is made from at least 4 modules 101. The modules 101 may be positioned side-by-side, or vertically. The modules can be arranged to form regular shapes, such as rectangles, or irregular shapes, such as triangles, circular, or cross. In one embodiment, the number of modules 101 is such that the matrix 100 is a square, for example, 2 modules×2 modules, or 3 modules×3 modules. The dimensions of the matrix 100 can range from a height of from 3 cm to 12 ft and a width of from 3 cm to 12 ft. The dimensions are preferably based upon the medium where the matrix 100 will be used. In the matrix, the modules 101 are spaced less than 10 cm apart.

As stated previously, the matrix 100 is made of individual modules 101. The modules 101 are developed from two units: an RGB LED unit 103 and a Knock Sensor Unit 105. Preferably, the Knock Sensor Unit 105 is positioned in front of the RGB LED unit 103. While not to be bound by theory, it is believed that putting the Knock Sensor Unit 105 and RGB LED unit 103 in the same housing will allow users to communicate bidirectionally with the matrix 100, thus enabling intuitive interaction between the user and the matrix 100. The module 101 can be of a size from several centimeters to several feet in height and width. The shape of the module 101 can be an irregular shape or regular shaped.

The RGB LED unit 103 and the Knock Sensor Unit 105 can be made of a variety of materials. For example, the RGB LED unit 103 can be made of metal, polymer, glass, and the like. The RGB LED unit 103 is preferably opaque, thus concealing the internal components of the module 101.

The Knock Sensor Unit 105 can be made from a variety of materials, such as polymer, glass, etc. The Knock Sensor Unit 105 should be clear or slightly smoked, to allow light to be emitted through the unit 105. The unit 105 should further be slightly thin to allow audible signals, for example "taps", to be transferred through the unit 105.

The matrix of modules and modules are used in conjunction with other components of the system. Other components of the user interface system, to be elaborated upon later, can include processors such as computer systems, encoders, decoders, networking components, and devices that are controlled though the user interface system. The matrix can be in communication with other components through wired or wireless means. Wired means can be methods well-known in the art, such as I/O cables. Wireless means can include infrared, Bluetooth™, radio frequency, and the like. Through communication, data is capable of being transferred throughout the system, translated, and one or more outputs, examples of outputs include audible sounds, i.e., music, visual displays, i.e., lighting, initiation of electronic devices, i.e., turning on the television, controlling living environments, i.e., air conditioning or controlling mechanical implements connected to electrical components, i.e., a door possessing an electrically controlled lock.

Figure 2A:
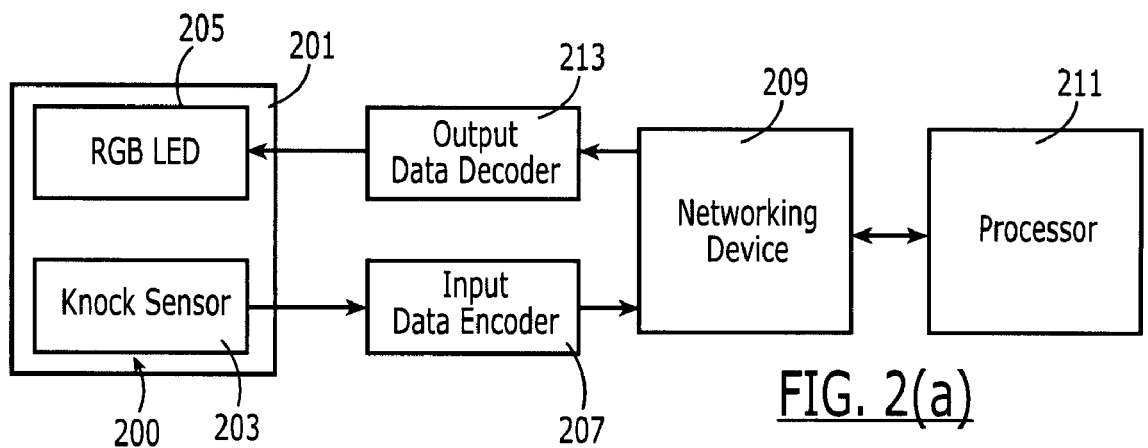
FIG. 2 shows the present user interface system, as well as a breakdown of the knock sensor unit and RGB LED unit of the system.

FIG. 2(a) exhibits further components of the present system 200, as well as the components of the Knock Sensor Unit 203 and the RGB LED unit 205.

As stated previously, the module 201 includes a Knock Sensor Unit 203 and an RGB LED unit 205. The Knock Sensor Unit 203 is in communication with an input data encoder 207, for the translation of the unit's 203 signal to a data code suitable for the networking device 209. As used herein, the unit's 203 signal is an audible signal, such as a "tap". Input data encoders 207, as taught by U.S. Pat. No. 4,700,362, incorporated by reference herein, are suitable for use in the present system 200.

From the input data encoder 207, a networking device 209 is connected thereto. The networking device 209 is used for providing communication between the input data encoder 207, processor 211, and output data decoder 213 in communication with the module 201. Suitable networking device 209 for use herein include networking switches or hubs.

The processor 211 serves to accept the encoded data, compare it with stored data, and issue any coded instructions to the output data decoder 213. In serving its purposes, the processor 211 works with operational algorithms, such as database algorithms, fuzzy algorithms, and comparison algorithms stored on a memory. The stored encoded data is stored on a memory connected to the processor 211, the memory being RAM, ROM (i.e. hard disk), or removable media. The stored encoded data contains a variety of individual data strings. The individual data strings are each associated with a specific coded instruction. Through the algorithm, if a determination is made that the inputted encoded data is equal to an individual data string, the specific coded instruction will be forwarded to the decoder, for example:

IF Inputted encoded data is equal to Data String A, THEN forward coded INSTRUCTION A to decoder The processor 211 can include a power source attached thereto. Suitable processors are well known in the art and include computer systems possessing memory, power supply and I/O components.

Coded instructions issued by the processor can include algorithms for activating the RGB LED unit, or algorithms for controlling any connected devices. In a preferred embodiment, two or more coded instructions are issued, for example an algorithm for activating the RGB LED unit, an algorithm for controlling an audible device, and an algorithm for controlling a lighting system.

The output data decoder 213 handles the coded instruction as delivered from the processor 211. As stated, in one embodiment, the output data decoder 213 forwards the coded instruction to one or more devices in addition to the RGB LED unit 205, for example audio devices, lighting devices, electronics such as video machines, and hand held devices. In this way, the module 201 is capable of controlling and operating multiple devices.

The output data decoder 213 effectively translates the coded instructions from a digital signal to one understandable by the devices. For example, the translation may be from a digital signal to an analog signal. Decoders well-known in the art, for example as taught in U.S. Pat. No. 3,860,908, incorporated herein by reference, are suitable for use in the present invention.

Whereas the embodiment shows the decoder and encoder separately they may be contained in one unit, termed an endec.

Figure 2B:
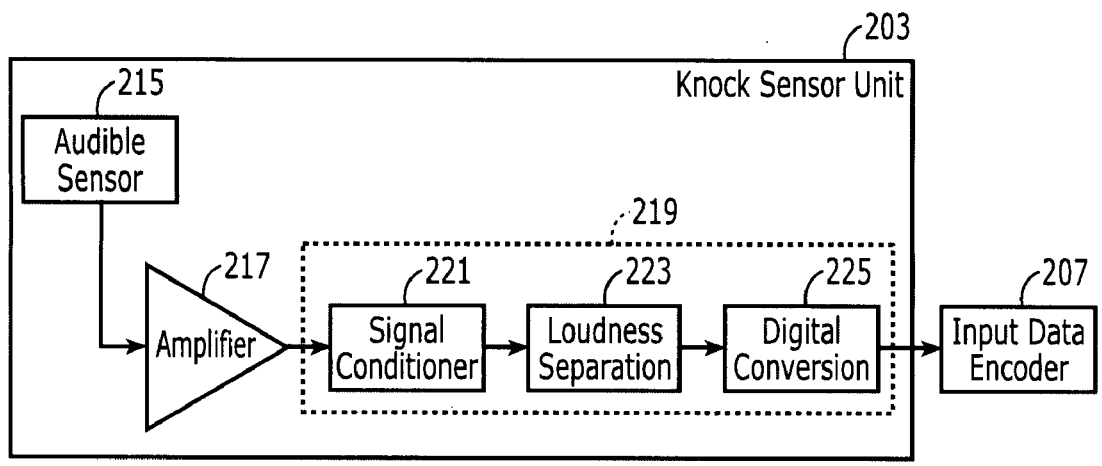

FIG. 2(b) shows an embodiment of the components of the knock sensor unit 203 of the module 201. The knock sensor unit 203 includes an audible sensor 215, for example a microphone 215. In one embodiment, the audible sensor 215 can include a sensitivity adjuster. The signal derived from the sensor 215 is amplified by an amplifier 217. The signal is then forwarded to a signal modification system 219. Firstly, the signal is conditioned by a signal conditioner 221. The signal conditioner 221 suppresses the level of noise and enhances the level of the knocking sound, thus enabling the knocking sound to stand out from unwanted noise in the surrounding environment. A loudness separator 223 is used for knock pulse formation. After the formation of the knock pulse, the pulse is passed to the digital converter 225 for generation of a digital signal of the knocking data. The digital signal is then forwarded to the input data encoder 207 for encoding.

Figure 2C:
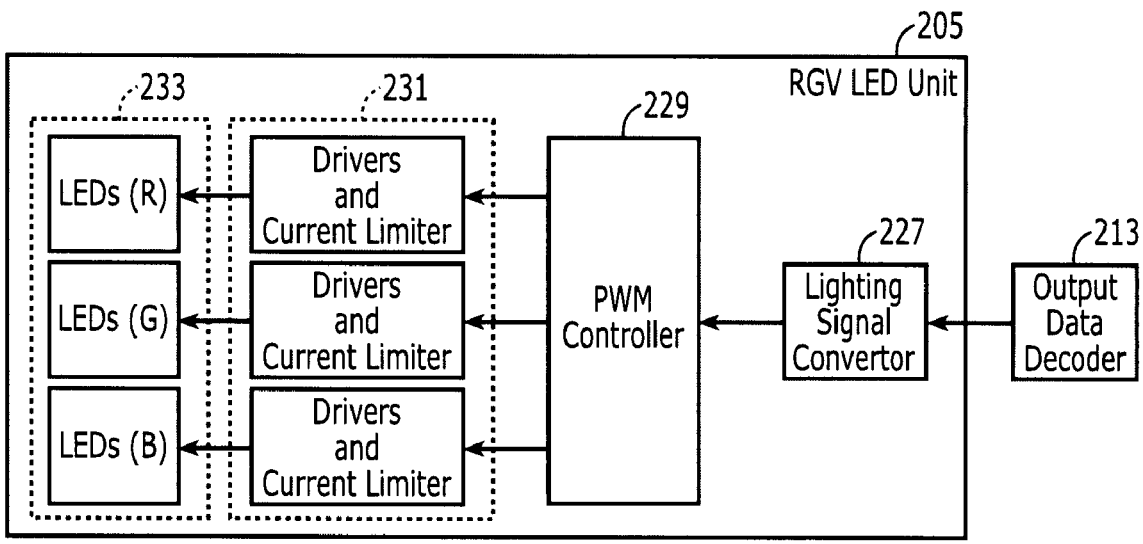

FIG. 2(c) is an embodiment of the RGB LED unit 205 of the module 201. The RGB LED unit 205 accepts the decoded signal from the output data decoder 213. A lighting signal convertor 227 receives the decoded data and converts the data into timing data format for the pulse width modulator (PWM) controller 229. Through the PWM controller 229, a timing signal is generated and forwarded to drivers and current limiter system 231 for amplification prior to being sent to LED groups 233. Through the LED groups 233, the modules 201 exhibit one or more colors, visible to the user.

In use, the forwarding of the coded instructions to the module 201 is a continuous, on-off, action, i.e., visible color flashes on and off in response to the coded instructions. As stated, the system is used to control other devices. The coded instructions as forwarded can be used to turn "on" the device, including "activating" the device.

Figure 3:
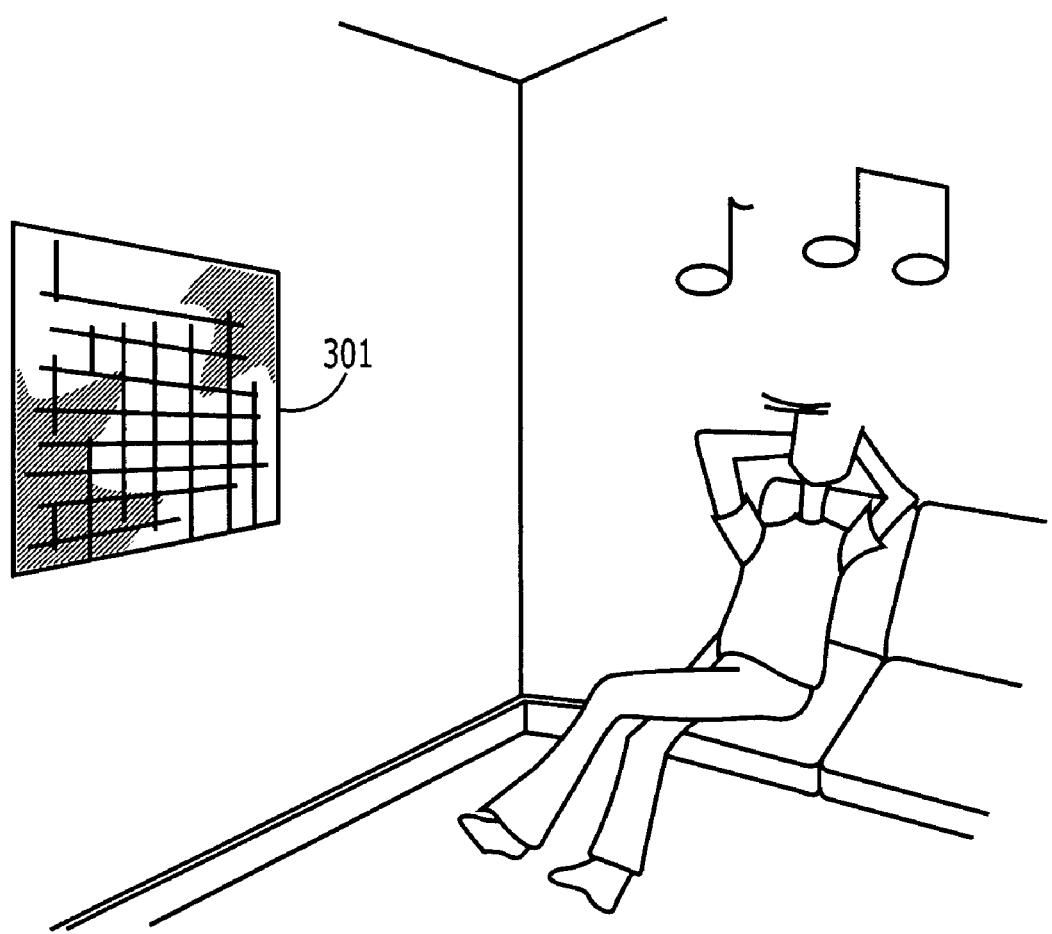
FIG. 3 shows embodiments of a wall embodiment of the present invention.
Figure 4:
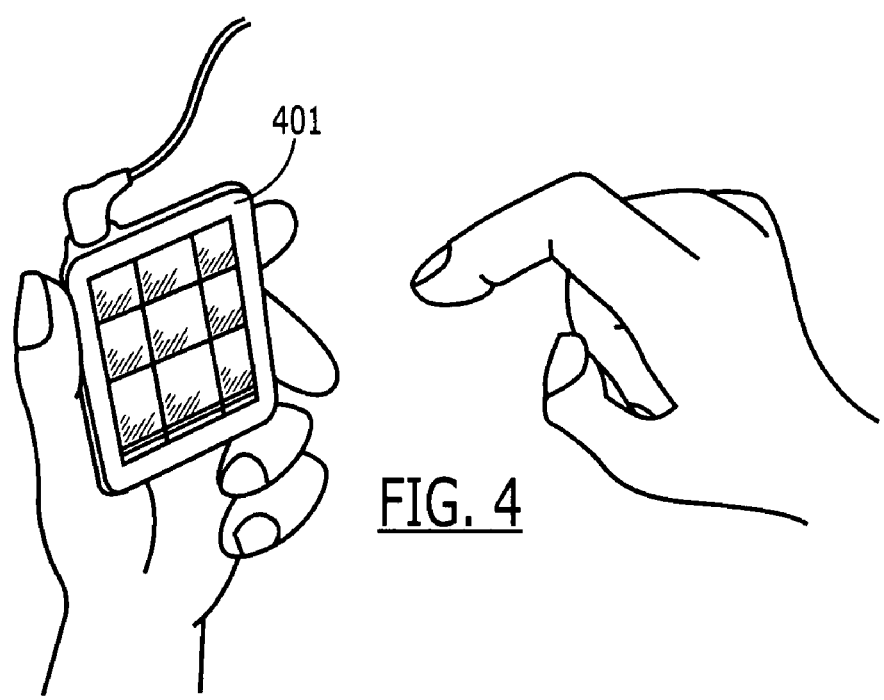
FIG. 4 shows an embodiment of a hand held embodiment of the present invention.

FIGS. 3 & 4 show the matrix of modules (301 and 401) in a variety of sizes and used in different embodiments.

FIG. 3 shows the matrix in a large size. In this embodiment, the matrix 301 can form part of a structure, such as a wall, or even the entire structure, i.e., the matrix can be the wall itself. Examples of possible environments include the home, night club, bar, restaurant, shopping arcade, retail environment, etc. The matrix 301 can be used to control devices within the environment.

FIG. 4 shows the matrix of modules used in a hand-held medium. In this embodiment, the matrix is used to control the hand held medium, whose purpose can be delivering audible sounds to a user through headphones.

In both embodiments, the matrices are suitable due to their ability to distinguish between "taps" from 1 to 10 cm apart. Without this capability, the matrix would not be a suitable interface because the system could not differentiate a tap sequence.

The present invention also relates to methods for controlling devices through tap sequence recognition. The knock sequence recognition occurs via a system including a matrix of modules serving as an interface.

FIG. 5 is an embodiment of a method of controlling devices through tap sequence recognition.

Upon starting 501 an interface made of a matrix of modules, the interface is placed in stand-by mode 503. A user brings the interface out of stand-by mode by tapping a sequence on the interface. The sequence can be based on different time intervals, for example (TAP) (TAP) (TAP) (TAP) (PAUSE) (TAP), or tapping in different positions, for example tapping to form a "+" pattern or tapping to form a "L" pattern. The interface, through its audible sensor, tracks the tapping sequence 505. When the sequence is completed, the interface differentiates and determines whether the sequence is "time-based" or "position-based" 507. Differentiation and determination can be made by an algorithm stored on a memory of the system.

After differentiation and determination, the tap sequence is encoded 509. The encoded tap sequence is then compared against a tap sequence stored on the system's memory. Comparison occurs by searching a database for a stored tap sequence alike the encoded tap sequence 511. The database can be accessed on a memory housed on the system, or it can be accessed on a removable media.

A determination is then made if the encoded tap sequence is alike a stored tap sequence 513. The stored tap sequence can range from exactly alike the encoded sequence to very similar to the encoded sequence. If the encoded tap sequence is very similar to a stored tap sequence, fuzzy algorithms, stored on the memory, can allow the system to judge the degree of similarity between the encoded tap sequence and the stored sequence. If there is no match, further database searching is performed 514. After numerous unsuccessful searches, a failed signal 515 is announced to the user. The interface then proceeds to stand-by mode 503. If there is a match, the system performs the intended function (controlling one or more devices) 517.

FIG. 6 is an embodiment of a time-based tap sequence performed on the interface of the present invention. Time-based tap sequence is the distribution or rhythm of knocks within a certain time frame. The formation of the rhythm depends on the time interval between taps. Varied time intervals between knocks result in different rhythm. The time-based tap sequence may take unlimited number of styles.

One example 603 would be as follows:
TAP (PAUSE) TAP, TAP (PAUSE) TAP (PAUSE) TAP, TAP (PAUSE) TAP (PAUSE)

Another example 605 could be:
TAP (PAUSE) TAP, TAP (PAUSE) (PAUSE) TAP, TAP TAP (PAUSE) TAP FIG. 7 is an embodiment of position-based knock sequence. Position-based tap sequence is based on the tracking of tap positions on the interface. In this embodiment, the positions of a sequence of taps occurred are being tracked. As shown, a first tap is made in a location 701/703, followed by a second tap 705/707, and a third location 709/711. Position-based tap sequences are not limited to 3 tap locations, but rather an unlimited number of locations. In one embodiment, a high number of tap locations are used, to provide a high level of security.

In the tap sequences both FIGS. 6 and 7, the system waits for a few seconds, 2-5 seconds, following the last tap to ensure the user has completed the entry.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. An user interface system, comprising as components
a matrix of at least 4 modules;
an input data encoder;
an output data decoder;
a networking device; and
a processor;
wherein said modules are comprised of a knock sensor unit, comprising audible sensor, amplifier, and a signal modification system, and a RGB LED unit, comprising a lighting signal convertor, pulse width modulator, current limiter system, and LED groups, and said modules are between 1 cm to 10 cm apart.

2. The user interface system of claim 1, further comprising a memory, wherein said memory has one or more operational algorithms stored thereon.

3. The user interface system of claim 1, wherein said matrix is a regular or irregular shape.

4. The user interface system of claim 1, wherein said components are connected by wireless means.

5. The user interface system of claim 1, wherein said processor is a computer system.

6. The user interface system of claim 1, wherein said audible sensor is a microphone.

7. A method of controlling devices through knock sequence recognition, comprising the steps of
starting the user interface system of claim 1;
bringing said system into a stand-by mode;
tapping on the interface on said system;
tracking said tap sequence;

differentiating and determining whether said sequence is "time-based" or "position-based";
encoding said tap sequences;
searching a database on a memory said system;
determining whether said encoded tap sequence matches a stored tap sequence on said database;
IF encoded tap sequence equals a stored tap sequence THEN controlling one or more devices; or
IF encoded tap sequence does not equal stored tap sequence THEN researching said database and
following re-searching said database
IF encoded tap sequence does not equal any stored tap sequence,
THEN putting system into stand by mode.

8. The method of controlling devices through knock sequence recognition of claim 7, wherein tapping on the interface can be time-based or position based tapping.

* * * * *